March 8, 1927. 1,620,402
H. H. SOPER
DIRECTION INDICATOR FOR AUTOMOBILES
Filed May 29, 1925 2 Sheets-Sheet 1
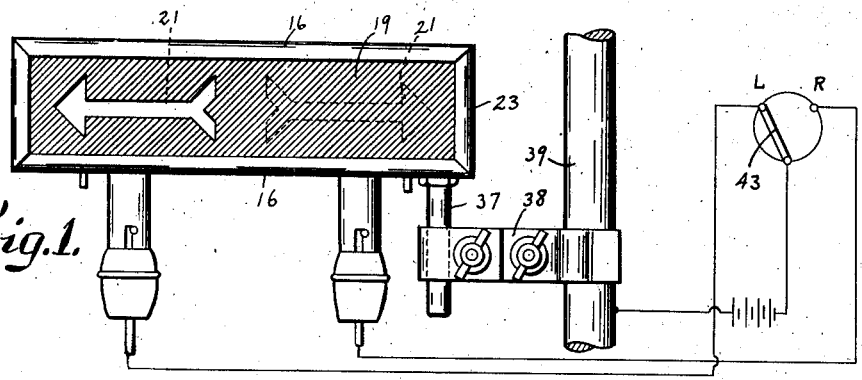
Fig.1.
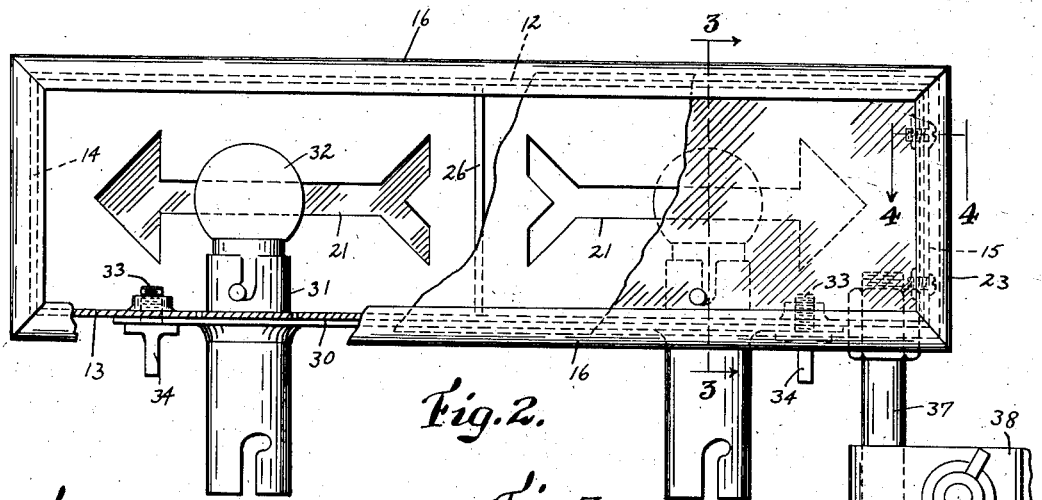
Fig.2.
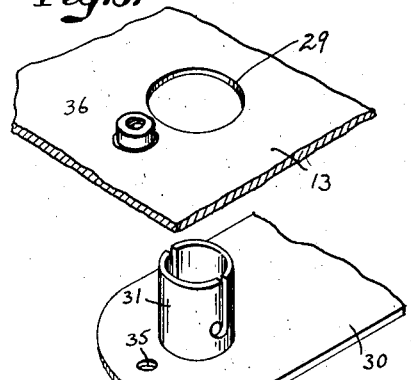
Fig.5.
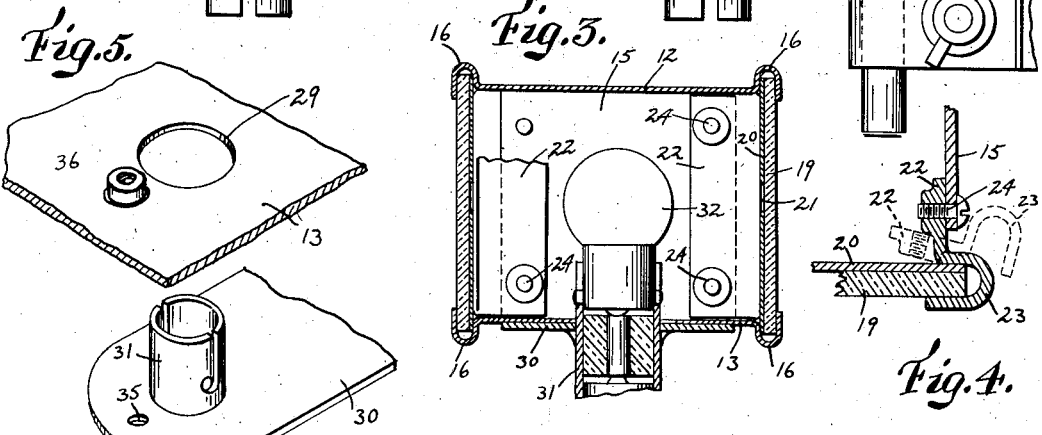
Fig.3.
Fig.4.
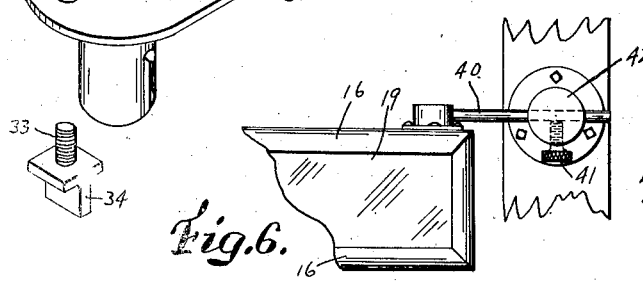
Fig.6.
Inventor
Harold H. Soper
Attys.

March 8, 1927.
H. H. SOPER
1,620,402
DIRECTION INDICATOR FOR AUTOMOBILES
Filed May 29, 1925
2 Sheets-Sheet 2
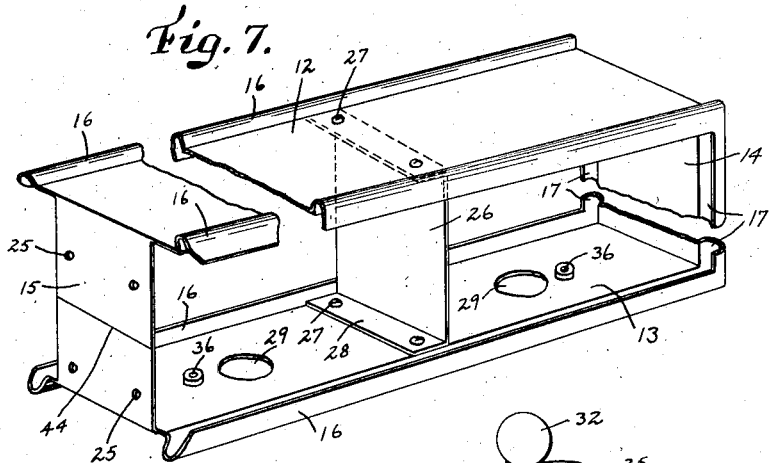
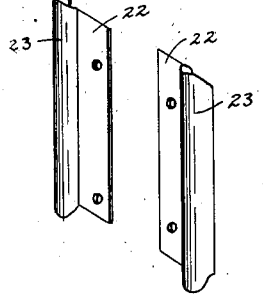
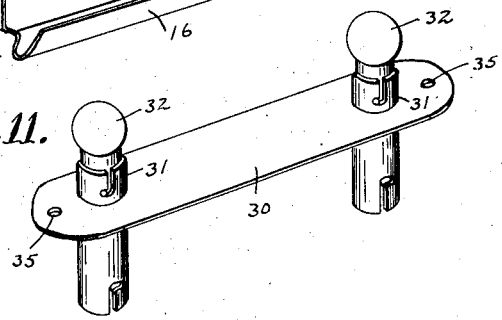
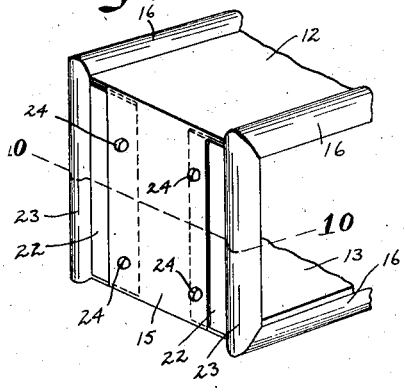
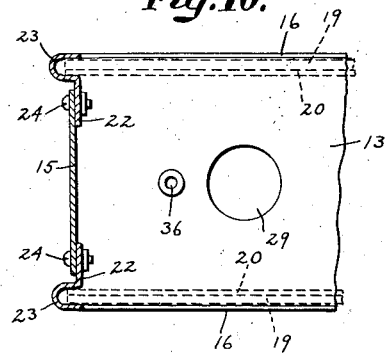
Inventor
Harold H. Soper
Attys.

Patented Mar. 8, 1927.

1,620,402

UNITED STATES PATENT OFFICE.

HAROLD H. SOPER, OF MEDFORD, MASSACHUSETTS, ASSIGNOR, BY DIRECT AND MESNE ASSIGNMENTS, TO SOMAC TRAFFIC SIGNAL CO., OF BOSTON, MASSACHUSETTS.

DIRECTION INDICATOR FOR AUTOMOBILES.

Application filed May 29, 1925. Serial No. 33,663.

This invention relates to a direction indicator adapted to be secured to a support on an automobile body, and to indicate to street traffic, either ahead or behind, the intention of the driver to turn to the right or to the left.

The invention relates particularly to an indicator including a box or casing, each of the opposite sides of which is formed by removable plates, one indicator plate being of translucent glass and the other of opaque material having light-transmitting openings, usually arrow-shaped and pointing in opposite directions, the casing being subdivided by a partition into two compartments, each containing an incandescent lamp. The lamps are adapted to be lighted alternately, and the usual arrangement is such that the lighting of one lamp indicates an intended turn to the right, and the lighting of the other lamp indicates an intended turning to the left.

The object of the invention is to provide a light, stiff, and durable frame composed entirely of sheet metal, adapted to securely confine the indicator plates, and of such rigidity that it is not liable to be distorted and cause the breakage of the glass plates.

I attain this and other related objects by the improved construction hereinafter described and claimed.

Of the accompanying drawings forming a part of this specification,—

Figure 1 is a side elevation of a direction indicator the frame of which embodies the invention, and a diagrammatic representation of a switch and circuit connections from the same to the lamps.

Figure 2 is an enlarged view similar to Figure 1, showing a portion broken away and in section.

Figure 3 is a section on line 3—3 of Figure 2.

Figure 4 is an enlarged section on line 4—4 of Figure 2.

Figure 5 is a fragmentary perspective view, showing a portion of the bottom member of the frame, a portion of the lamp-holding plate, and an element of the means employed to secure the plate to the bottom member.

Figure 6 is a view similar to a portion of Figure 1, showing different means for supporting the indicator.

Figure 7 is a perspective view of the frame portion of the casing, parts being broken away to indicate the form in cross section.

Figure 8 shows in perspective the plate retainers hereinafter described.

Figure 9 is a view similar to a portion of Figure 7, showing the plate retainers secured to the frame.

Figure 10 is a section on line 10—10 of Figure 9.

Figure 11 is a perspective view of the lamp-holding plate, and the lamp sockets and lamps held thereby.

The same reference characters indicate the same parts in all of the figures.

My improved indicator comprises an oblong frame composed of a top member 12, a bottom member 13, an inner end member 14, and an outer end member 15. The top and bottom members have longitudinal channelled flanges 16, which are open at one end of the frame, as shown by Figure 7. The flanges of the top member open downwardly, and those of the bottom member upwardly. The inner end member 14 connects the inner ends of the top and bottom members, and is provided with transverse channelled stop flanges 17, connecting the inner ends of the flanges 16 and constituting stops limiting endwise movement of the hereinafter described indicator plates in one direction. The outer end member 15 connects the outer ends of the top and bottom members, and is narrower than the members 12 and 13, as shown by Figure 7, so that the end member 15 does not obstruct the outer ends of the channels formed by the longitudinal flanges 16. The sides of the frame are open and are bounded at three edges by the flanges 16 and the stop flanges 17.

19 and 20 designate plates which are insertible in the open ends of the flange channels, and are formed to fill the open sides of the frame, said plates abutting the stop flanges 17 when in their operative positions. There are two pairs of plates as shown by Figure 3, each pair including an outer plate 19, preferably of translucent material, preferably opal glass, and an inner plate 20, preferably of sheet metal having at opposite sides of its longitudinal center two arrow-shaped openings 21, pointing in opposite directions.

When the plates are inserted in the channels of the longitudinal flanges 16, and their inner ends are abutted against the channelled stop flanges 17, they are secured against outward end-wise movement by plate retainers including channelled portions 23, formed to fill the spaces between the open ends of the flanges 16, and means for detachably securing the channelled portions 23 to the end member 15. Said securing means may be embodied in base portions 22, formed integral with the channelled portions 23, as shown by Figure 8, and adapted to bear on the inner side of the end member 15, as shown by Figure 4, and screws 24 inserted in orifices 25 (Figure 7) in the end member 15, and in tapped orifices in the base portions 22. The plates are thus firmly secured in position and are adapted to be conveniently inserted and removed. The channelled portions 23 and base portions 22 are adapted to be held in the position indicated by dotted lines in Figure 4, and then swung to the full line position, and secured by the screws 24.

26 designates a partition secured to the top and bottom members 12 and 13, preferably by screws 27 (Figure 7) inserted in the top and bottom members and engaged with flanges 28 on opposite ends of the partition. The width of the partition is such that the inner plates 20 are in close proximity to the edges of the partition, so that the casing formed by the frame and the plates, is subdivided into two compartments.

The bottom member is provided with lamp-receiving orifices 29, at opposite sides of the partition. 30 designates a lamp-holding plate having lamp sockets 31, with which incandescent lamps 32 are engaged by the usual, or any suitable means. The arrangement is such that the sockets and lamps may be inserted simultaneously in the orifices 29, until the plate 30 comes to a bearing on the bottom member 13, the plate and the sockets being movable as a unit. The plate is then detachably secured to the bottom member by thumb screws 33, having heads 34, the screws being inserted in orifices 35 in the ends of the plate 30, and in tapped orifices 36 in the bottom member 13. Upon the removal of the screws 33, the plate and the lamps may be simultaneously removed.

The bottom member of the frame may be provided with a projecting stud 37, as shown by Figures 1 and 2, provided with a clamping member 38, adapted to detachably engage a supporting part, such as a member 39 of a windshield frame. If desired, the frame may be provided with a horizontally extending rod 40, adapted to be secured by a set screw 41 to a socketed holder 42, fixed to any suitable portion of an automobile body.

A switch 43 and circuit connections therewith may be provided, as shown diagrammatically by Figure 1, to light either of the lamps 32 and extinguish the other. The switch may be located on the vehicle dash, or elsewhere.

The bottom member 13, the top member 12, the connecting member 14, and the plate retainers 22 are all made of sheet metal. The butt joint 44, shown at the left in Figure 7, is formed by the abutting together two ears integral with the top and bottom members and bent in opposite directions therefrom, said ears constituting a web forming an element of the end member opposite the connecting end member 14. The plate retainers 22 extend across the butt joint 44, and reinforce the web, as shown by Figure 9.

The channeled flanges formed on the top and bottom members 12 and 13, the connecting end member 14, and the plate retainers stiffen said parts and prevent rocking and distortion of the frame, so that although the frame is made entirely of thin sheet metal, it is so stiff and rigid that it is not liable to be bent or buckled sufficiently to cause breakage of the glass plates 19.

The lamp-holding plate 30, secured to the bottom member, additionally reinforces said member and stiffens it between the longitudinal flanges, said plate compensating for the weakening of the bottom member by the formation of the lamp-receiving orifices 29 therein.

The partition 26 fixed to the top and bottom members of the frame, between the longitudinal channeled flanges and between the lamps, constitutes a strut which additionally stiffens the bottom and top members.

The indicator as a whole, is a very light weight structure. In consequence of this fact, and the stiffness and rigidity of the frame, the indicator is adapted to withstand rough usage, shocks and jars, without deterioration.

I claim:

1. A direction indicator comprising a casing composed of an oblong, open-sided frame containing lamps, and indicator plates confined by the frame in position to cooperate with the lamps, the frame being wholly of sheet metal and including a bottom member having integral upwardly opening longitudinal channeled flanges, a top member having integral downwardly opening longitudinal channeled flanges, an end member connecting the top and bottom members at one end of the frame, and having integral vertical channeled flanges closing the longitudinal flanges at said end, the longitudinal flanges being open at the opposite end of the frame, so that the indicator plates are slidable into said flanges until arrested by the vertical flanges, and a reinforced opposite end member including ears integral with the bottom and top members, oppositely bent therefrom, and abutted together and united to form a web having a horizontal butt joint, the web being entirely between the open ends of the longitudinal flanges, so that it does not interfere with the sliding of the indicator plates, the reinforced end member including also plate retainers, extending across the butt joint and detachably secured to the web, said retainers reinforcing the web and having vertical channeled flanges which close the open ends of the longitudinal channels and confine the indicator plates therein, the channeled flanges formed on the bottom and top members, the connecting end member, and the plate retainers, stiffening said parts and preventing racking and distortion of the frame.

2. A direction indicator as specified by claim 1, the bottom member being provided with two lamp-receiving orifices and with a plate supporting the lamps, the plate being screwed to the bottom member and additionally stiffening the same, the frame including also a vertical partition fixed to the bottom and top members between the longitudinal channeled flanges and between the lamps, said partition constituting a strut which additionally stiffens the bottom and top members.

In testimony whereof I have affixed my signature.

HAROLD H. SOPER.